United States Patent
Tewfik

(10) Patent No.: US 7,366,908 B2
(45) Date of Patent: Apr. 29, 2008

(54) DIGITAL WATERMARKING WITH CONTENT DEPENDENT KEYS AND AUTOCORRELATION PROPERTIES FOR SYNCHRONIZATION

(75) Inventor: Ahmed Tewfik, Edina, MN (US)

(73) Assignee: Digimarc Corporation, Beaverton, OR (US)

( * ) Notice: Subject to any disclaimer, the term of this patent is extended or adjusted under 35 U.S.C. 154(b) by 1376 days.

(21) Appl. No.: 10/360,794

(22) Filed: Apr. 30, 2001

(65) Prior Publication Data

US 2004/0174996 A1 Sep. 9, 2004

Related U.S. Application Data

(63) Continuation-in-part of application No. 08/921,931, filed on Aug. 27, 1997, now Pat. No. 6,226,387, which is a continuation-in-part of application No. 08/918,126, filed on Aug. 27, 1997, now Pat. No. 6,272,634, which is a continuation-in-part of application No. 08/918,125, filed on Aug. 27, 1997, now Pat. No. 6,282,299.

(60) Provisional application No. 60/050,587, filed on Jun. 24, 1997, provisional application No. 60/024,979, filed on Aug. 30, 1996.

(51) Int. Cl.
*H04L 9/00* (2006.01)

(52) U.S. Cl. .................. 713/176; 705/57; 726/30; 726/32; 380/201; 380/207; 725/31

(58) Field of Classification Search ................ 713/176; 380/201, 208, 207, 279; 705/57; 725/31; 726/26, 31, 30, 32
See application file for complete search history.

(56) References Cited

U.S. PATENT DOCUMENTS

| | | | |
|---|---|---|---|
| 3,845,391 A | 10/1974 | Crosby | 455/39 |
| 4,313,197 A | 1/1982 | Maxemchuck | 370/210 |
| 4,939,515 A | 7/1990 | Adelson | 341/51 |
| 4,979,210 A | 12/1990 | Nagata et al. | 360/60 |
| 5,010,405 A | 4/1991 | Schreiber et al. | 348/432.1 |
| 5,319,735 A | 6/1994 | Preuss et al. | 704/205 |
| 5,404,377 A | 4/1995 | Moses | 375/145 |
| 5,450,490 A | 9/1995 | Jensen et al. | 380/253 |
| 5,530,759 A | 6/1996 | Braudaway et al. | 380/54 |
| 5,581,800 A | 12/1996 | Fardeau et al. | 455/201 |
| 5,613,004 A | 3/1997 | Cooperman et al. | 380/28 |
| 5,636,292 A | 6/1997 | Rhoads | 382/232 |
| 5,646,997 A | 7/1997 | Barton | 713/176 |
| 5,652,626 A | 7/1997 | Kawakami et al. | 348/463 |
| 5,719,937 A | 2/1998 | Warren et al. | 380/203 |
| 5,721,788 A | 2/1998 | Powell et al. | 382/100 |
| 5,765,152 A | 6/1998 | Erickson | 707/9 |
| 5,774,452 A | 6/1998 | Wolosewicz | 370/212 |

(Continued)

OTHER PUBLICATIONS

"Access Control and COpyright Protection for Images, WorkPackage 8: Watermarking," Jun. 30, 1995, 46 pages.

(Continued)

*Primary Examiner*—Emmanuel L. Moise
*Assistant Examiner*—Paul Callahan

(57) ABSTRACT

A digital watermark detection method exploits autocorrelation properties of the watermarked signal that enable synchronization of the digital watermark despite temporal or geometric distortion of the host signal. Other watermark methods employ keys, including a key dependent on the content in which the watermark is embedded and another key that is not dependent on the content.

3 Claims, 3 Drawing Sheets

U.S. PATENT DOCUMENTS

| | | | | |
|---|---|---|---|---|
| 5,822,360 | A | 10/1998 | Lee et al. | 380/28 |
| 5,822,432 | A | 10/1998 | Moskowitz et al. | 380/20 |
| 5,825,892 | A | 10/1998 | Braudaway et al. | 380/51 |
| 5,835,639 | A | 11/1998 | Honsinger et al. | 382/278 |
| 5,841,978 | A | 11/1998 | Rhoads | 709/217 |
| 5,845,281 | A | 12/1998 | Benson et al. | 707/9 |
| 5,857,038 | A | 1/1999 | Owada et al. | 382/284 |
| 5,859,920 | A | 1/1999 | Daly et al. | 382/115 |
| 5,862,260 | A | 1/1999 | Rhoads | 382/232 |
| 5,892,900 | A | 4/1999 | Ginter et al. | 726/26 |
| 5,930,369 | A | 7/1999 | Cox et al. | 380/54 |
| 5,943,422 | A | 8/1999 | Van Wie et al. | 705/54 |
| 5,963,909 | A | 10/1999 | Warren et al. | 705/1 |
| 6,031,914 | A * | 2/2000 | Tewfik et al. | 380/54 |
| 6,122,403 | A | 9/2000 | Rhoads | 382/233 |
| 6,141,753 | A | 10/2000 | Zhao et al. | 713/176 |
| 6,243,480 | B1 | 6/2001 | Zhao et al. | 382/100 |
| 6,285,774 | B1 | 9/2001 | Schumann et al. | 382/100 |
| 6,359,985 | B1 | 3/2002 | Koch et al. | 380/54 |
| 6,374,036 | B1 | 4/2002 | Ryan et al. | 386/94 |
| 6,398,245 | B1 | 6/2002 | Gruse et al. | 280/278 |
| 7,171,018 | B2 * | 1/2007 | Rhoads et al. | 382/100 |
| 2003/0103645 | A1 * | 6/2003 | Levy et al. | 382/100 |
| 2006/0129627 | A1 * | 6/2006 | Phillips et al. | 709/200 |

OTHER PUBLICATIONS

Anderson, Stretching the Limits of Steganography Proc. First Int. Workshop on Information Hiding, May, 1996, pp. 39-48.

Aura, "Practical Invisibility in Digital Communication," Proc. First Int. Workshop on Information Hiding, May, 1996, pp. 265-278.

Bender et al., "Techniques for Data Hiding," Massachusetts Institute of Technology, Media Laboratory, Jan. 1995, 10 pages.

Dautzenberg, "Watermarking Images," Department of Microelectronics and Electrical Engineering, Trinity College Dublin, 47 pages, Oct. 1994.

Koch et al., "Copyright Protection for Multimedia Data," Proc. Of the Int. Conf. On Digital Media and Electronic Publishing, Leeds, U.K., Dec. 16, 1994, 15 pages.

Linnartz et al., Philips Electronics Response to Call for Proposals Issued by the Data Hiding SubGroup of the Copy Protection Technical Working Group, Oct. 3, 2002, 32 pages.

Macq et al., "Access Control and Copyright Protection for Images, Workpackage 1: Access Control and Copyright protection for Images Needs Evaluation," RACE Project M1005, Jun. 1995, 22 pages.

Matsui et al., "Embedding a Watermark to Binary Pictures in Hardcopy System," Memoirs of the National Defense Academy, Japan, vol. 36, No. 2, (1997), pp. 13-20.

Matsui et al., "Video-Steganography: How to Secretly Embed a Signature in a Picture," IMA Intellectual Property Project Proceedings, vol. 1, Issue 1, pp. 187-204.

Matsui et al., "Use of the Wavelet Transformation to Embed Signatures in Images," Systems and Computers in Japan, Jan. 1997, vol. 28, No. 1, pp. 87-94.

Nakamura et al., "A Unified Coding Method of Image and Text Data Using Discrete Orthogonal Transform," Systems and Computers in Japan, vol. 21, No. 3, 1990, pp. 87-92.

Nakamura et al., "A Unified Coding Method of Dithered Image and Text Data Using Micropatterns," Electronics and Communications in Japan, Part 1, vol. 72, No. 4, 1989, pp. 50-56.

Szepanski, "A Signal Theoretic Method for Creating Forgery-Proof Documents for Automatic Verification," Proceedings 1979 Carnahan Conference on Crime Countermeasures, May 16, 1979, pp. 101-109.

Tanaka et al., "New Integrated Coding Schemes for Computer-Aided Facsimile," Proc. IEEE Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

Tanaka et al., "A Visual Retrieval System with Private Information for Image Database," Proceeding International Conference on DSP Applications and Technology, Oct. 1991, 00. 415-421.

Tirkel et al, "Electronic Water Mark," DICTA-93, Macquarie University, Sydney, Australia, Dec. 1993, pp. 666-673.

Zhao et al., "Embedding Robust Labels into Images for Copyright Protection," Proc. Of the International Congress on Intellectual Property Rights for Specialized Information, Knowledge and New Technologies, Aug. 21, 1995, 10 pages.

Zhao, "A WWW Service to Embed and Prove Digital Copyright Watermarks," Proc. Of the European Conf. On Multimedia, Services and Techniques, May 1, 1996, pp. 1-15.

* cited by examiner

DIGITAL WATERMARKING WITH CONTENT DEPENDENT KEYS AND AUTOCORRELATION PROPERTIES FOR SYNCHRONIZATION

RELATED APPLICATION DATA

This application is a continuation-in-part of application Ser. No. 08/921,931, filed Aug. 27, 1997 (now U.S. Pat. No. 6,226,387), which claims priority to provisional applications No. 60/050,587, filed Jun. 24, 1997, and 60/024,979, filed Aug. 30, 1996.

This application is also a continuation-in-part of application Ser. No. 08/918,126, filed Aug. 27, 1997 (now U.S. Pat. No. 6,272,634), which claims priority to provisional applications No. 60/050,587, filed Jun. 24, 1997, and 60/024,979, filed Aug. 30, 1996.

This application is also a continuation-in-part of application Ser. No. 08/918,125, filed Aug. 27, 1997 (now U.S. Pat. No. 6,282,299), which claims priority to provisional applications No. 60/050,587, filed Jun. 24, 1997, and 60/024,979, filed Aug. 30, 1996. This application resulted from conversion of provisional application No. 60/287,873 to a nonprovisional application, in accordance with the provisions of 37 CFR 1.53(c)(3).

RELATED FILES

This application is related to cofiled, copending and coassigned application entitled "SYSTEMS AND METHODS FOR INTERCEPTING MEDIA DATA, INCLUDING WAVEFORM DATA", Ser. No. 09/846,686, which is hereby incorporated by reference herein for all purposes.

GOVERNMENT RIGHTS STATEMENT

The inventions detailed in applications 08/918,125, 08/921,931, and 08/918,126 were made with government support by AFOSR under grant AF/F49620-94-1-0461, NSF under grant NSF/INT-9406954 and ARPA GRANT No. AF/F49620-93-1-0558. The Government has certain rights in those inventions.

FIELD

The invention relates to digital watermarking.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright @ 2001, Cognicity, Inc. All Rights Reserved.

SUMMARY OF THE INVENTION

One aspect of the invention is a method of detecting a digital watermark embedded in a host signal. The method receives the host signal including a media signal and a digital watermark that has been perceptually adapted to the media signal in frequency and non-frequency domains. The method processes the host signal with a representation of the digital watermark to compute a measure of the digital watermark. Based on the measure of the digital watermark, the method extracts the digital watermark from the host media signal. The host signal has autocorrelation properties that enable synchronization of the digital watermark despite temporal or geometric distortion of the host signal.

Another aspect of the invention is a method of digital watermarking a media signal. This method derives a first key that is a function of the media signal, generates a digital watermark signal that is a function of the first key and a second key that is not dependent on the media signal, and embeds the digital watermark in the media signal.

Another aspect of the invention is a method of detecting a digital watermark in a host signal. This method obtains a first key that is a function of the host signal, generates a representation of a digital watermark from the first key and a second key that is not dependent on the host signal, and processes the host signal with the representation of the digital watermark to extract the digital watermark from the host signal.

DETAILED DESCRIPTION

The detailed description describes systems, clients, servers, methods, and computer-readable media of varying scope. In the following detailed description, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

The detailed description is divided into multiple sections. In the first section the hardware and operating environment of different embodiments. In the second section, the software environment of varying embodiments. In the final section, a conclusion is provided.

Hardware and Operating Environment

Figure 1:
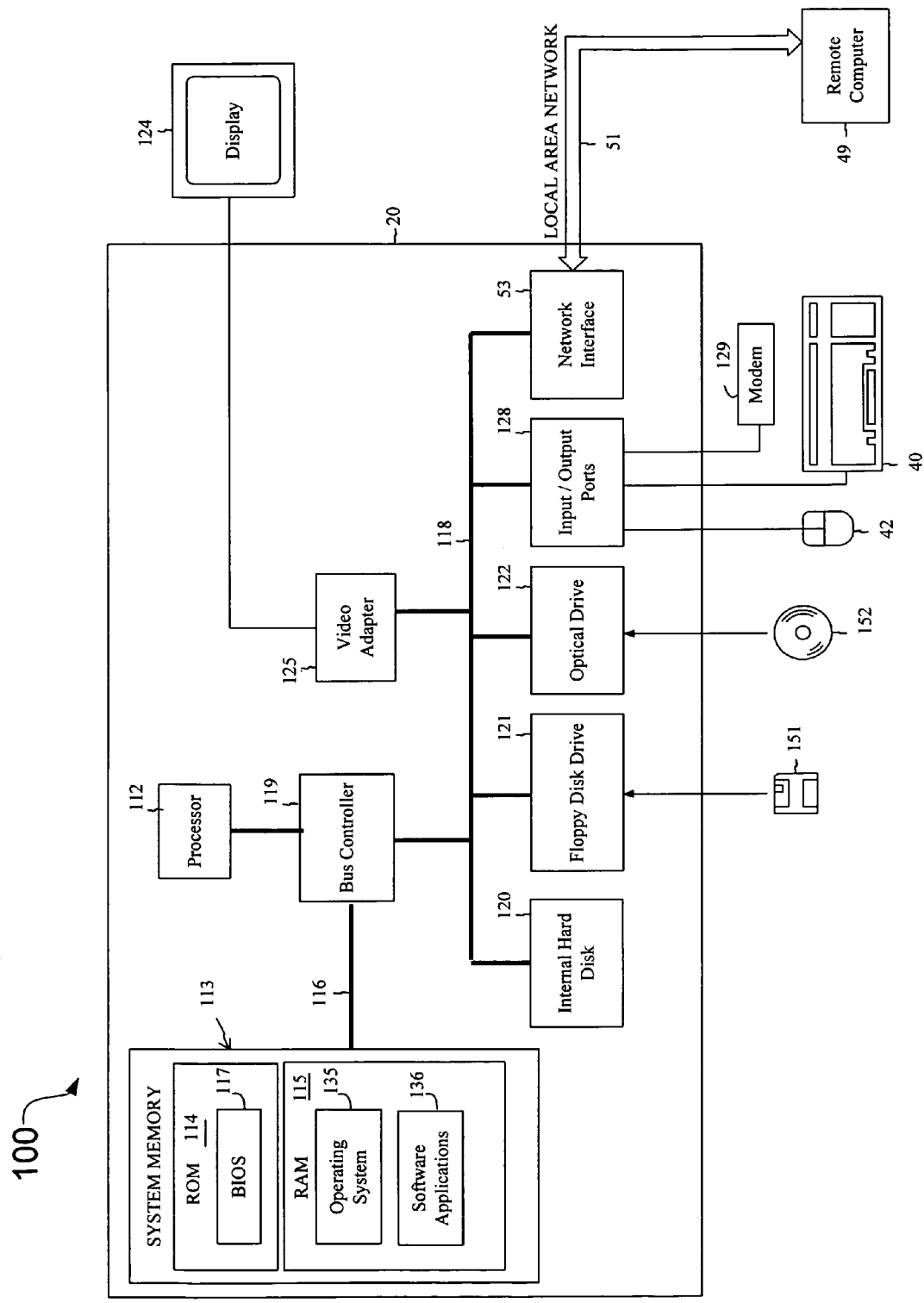
FIG. 1 is a block diagram of the hardware and operating environment in which different embodiments of the invention can be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented.

Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 1, the computing system 100 includes a processor. The invention can be implemented on computers based upon microprocessors such as the PENTIUM® family of microprocessors manufactured by the Intel Corporation, the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. Computing system 100 represents any personal computer, laptop, server, or even a battery-powered, pocket-sized, mobile computer known as a hand-held PC.

The computing system 100 includes system memory 113 (including read-only memory (ROM) 114 and random access memory (RAM) 115), which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the computing system 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM or DVD-ROM drive that is used to read an optical disk 152. The video display 124 or other kind of display device is connected to the input/output bus 118 via a video adapter 125.

A user enters commands and information into the computing system 100 by using a keyboard 40 and/or pointing device, such as a mouse 42, which are connected to bus 118 via input/output ports 128. Other types of pointing devices (not shown in FIG. 1) include track pads, track balls, joy sticks, data gloves, head trackers, and other devices suitable for positioning a cursor on the video display 124.

As shown in FIG. 1, the computing system 100 also includes a modem 129. Although illustrated in FIG. 1 as external to the computing system 100, those of ordinary skill in the art will quickly recognize that the modem 129 may also be internal to the computing system 100. The modem 129 is typically used to communicate over wide area networks (not shown), such as the global Internet. The computing system may also contain a network interface card 53, as is known in the art, for communication over a network.

Software applications 136 and data are typically stored via one of the memory storage devices, which may include the hard disk 120, floppy disk 151, CD-ROM/DVD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. For example, when the user wants to load a software application 136, the operating system 135 interprets the instruction and causes the processor 112 to load software application 136 into RAM 115 from either the hard disk 120 or the optical disk 152. Once software application 136 is loaded into the RAM 115, it can be used by the processor 112. In case of large software applications 136, processor 112 loads various portions of program modules into RAM 115 as needed.

The Basic Input/Output System (BIOS) 117 for the computing system 100 is stored in ROM 114 and is loaded into RAM 115 upon booting. Those skilled in the art will recognize that the BIOS 117 is a set of basic executable routines that have conventionally helped to transfer information between the computing resources within the computing system 100. These low-level service routines are used by operating system 135 or other software applications 136.

In one embodiment computing system 100 includes a registry (not shown) which is a system database that holds configuration information for computing system 100. For example, Windows® 95, Windows 98®, Windows® NT, Windows 2000® and Windows Me® by Microsoft maintain the registry in two hidden files, called USER.DAT and SYSTEM.DAT, located on a permanent storage device such as an internal disk.

Software Environment

Figure 2:
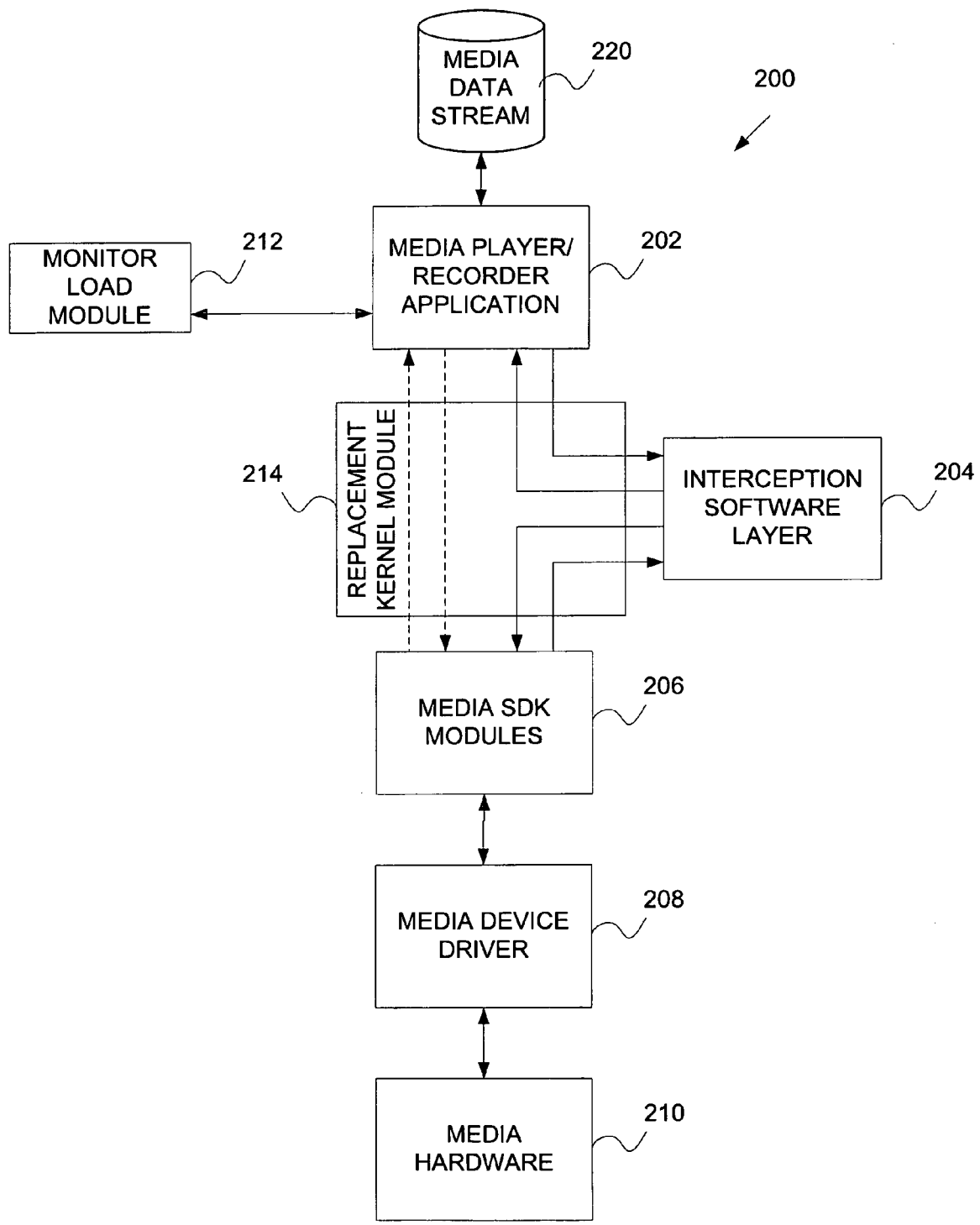
FIG. 2 is a diagram illustrating a system level overview of an exemplary embodiment of a media interception system.

This section describes a software environment of systems and methods that provide for interception of media data. FIG. 2 is a block diagram describing the major components of a media interception system 200 according to an embodiment. In one embodiment, media interception system includes a media player/recorder application 202, media SDK (Software Development Kit) 206, media device driver 208 and interception layer software 204.

Media player/recorder application 202 is an application that can playback and/or record audio, video or other multimedia data using hardware on a computer system, such as computer 100 (FIG. 1). Examples of such applications include the RealPlayer and RealJukebox applications from RealNetworks Inc., the Winamp player from Nullsoft, Inc., and the Windows Media Player application from Microsoft Corp. In general, a media player/recorder application 202 is capable of reading and/or writing at least one type of media data stream 220. An example of a particular media type is the waveform audio type. Waveform audio data can be stored in multiple formats. One popular format is the WAV (Microsoft RIFF format), which stores the audio data in a non-compressed form. Other waveform formats store the data in compressed form. These formats include the Microsoft Windows Audio format (wm, .wma), Real Audio format (.ra), the Sun Audio format (.au) and the MP3 (.mp3) format. These formats are listed as exemplary formats; the invention is not limited to any particular format.

The media data streams 220 can be stored in a number of ways. For example, the data streams can come from a file that resides on a hard drive, a CD-ROM, or a DVD-ROM. Alternatively, the data streams can reside on a remote system, and can be transferred to the application over a network such as the Internet. The invention is not limited to any particular source for the data stream.

Some audio systems add an additional encryption layer to the compressed audio data for copyright protection purposes. Despite the fact that the audio data may be encrypted, compressed or even specially processed, the audio data that goes to the media SDK 206 has to be in wave format. It is the application responsibility to convert the compressed/encrypted/processed audio data to regular wave format.

Media SDK 206 comprises a collection of modules that provide an API (Application Program Interface) that enables software developers to develop applications that play and/or record media data streams, such as audio or video data streams. In one embodiment, the media SDK 206 is a waveform Software Development Kit (SDK) from Microsoft Corporation that enables software applications developers to develop applications that receive waveform input data from audio devices and play the waveform audio data through the output audio device. Software developers can use the waveform SDK to add sound effects to applications and capture the audio input from the microphone, sound card line-in and any audio input device. For both waveform input and waveform output services, the waveform SDK uses the standard wave format to represent the audio data. In some embodiments, this wave format is defined using the WAVEFORMATHDR and WAVEFORMATEX data structures defined by the SDK. Applications 202 can communicate with SDK 204 either by direct function calls to the SDK APIs or through sending messages to the SDK to request the proper operation.

It should be noted that FIG. 2 has illustrated a single media player/recorder application 202. However, in some embodiments of the invention, media SDK 206 can support playing waveform buffers from a plurality of different instances of an application 202 simultaneously as well as capturing input from the audio in devices. Thus, the invention is not limited to any particular number or type of media player/recorder applications.

Media device driver 208 provides an interface to control a particular type of media hardware 210. For example, media device driver 208 can be a sound card device driver for controlling input and input for a particular brand of sound card in a computer system.

Interception layer software 204 intercepts, collects, filters and controls media input and output data. In one embodiment, the interception layer software 204 controls waveform audio data. The interception layer software 204 logically resides between a media player/recorder application 202 and the media SDK 206, and emulates the API calls and message handling of a media SDK. In addition, media SDK 206 can emulate callback functions on behalf of an application 202. Thus, to media player/recorder application 206, the interception layer appears as a media SDK, and to media SDK, the interception software layer appears to be an application.

The interception layer software 204 can apply its functions to any media player/recorder application 202. In some embodiments, these media player/recorder applications 202 are capable of running under any or all Microsoft Windows platforms. In one embodiment, the interception layer software 204 collects and controls the waveform input data as it goes from the audio input device before it reaches the application and collects and controls the waveform output data as it goes from the application and before it reaches the audio output device 210 via media SDK 206.

In some embodiments, particularly those embodiments that operate in a Microsoft Windows environment, the interception software 204 includes a replacement kernel module 214 that can replace a previously existing kernel32.dll. The replacement kernel module 214 provides all the services that the original kernel32.dll exports to other system modules and applications. In addition, replacement kernel module 214 provides additional processing as described below.

In various embodiments, the interception software layer 204 must be installed before it will operate. In embodiments that operate on Windows 95, Windows 98 and Windows Me platforms, during the software installation process, a windows-modules-patching component patches the winmm.dll file and changes the reference of the Windows kernel32.dll to refer to the replacement kernel module 214. This type of system file patching forces the Windows applications loader to load the interception layer software 204 in the address space of any application 202 that imports services from winmm.dll.

In some embodiments, during the loading of any media player/recorder application 202, if the winmm.dll is used by application 202 or any one of its referenced modules, then the Windows platform loads the interception software layer 204, including the replacement kernel module 214 in the address space of the application 202. As mentioned earlier, this is because winmm.dll has been patched to refer to the replacement kernel module 214 instead of the original windows kernel32.dll. Loading the interception layer software 204 by the replacement kernel module 214 ensures that the software 204 will be active in the address space of any application that uses services exported from winmm.dll. This is desirable, because doing so provides optimal system performance, as the software 204 is active only when there is a request for a winmm.dll service.

In embodiments that operate on the Windows NT and Windows 2000 platforms, the installation software places standard entries in the Windows registry database that forces the loading of the interception layer software 204 inside the address space of any running media player/recorder application 202.

Thus in embodiments that operate on Windows NT or Windows 2000, Windows loads the replacement kernel software 214 as it loads a media player/recorder application 202. During the application loading process for a media player/recorder application 202, the new kernel software 214 checks if the winnmm.dll is loaded or not. If it is not loaded, it then activates the interception layer software 204 for this application's address space. Otherwise it stays passive and listens to application requests. If there is a new request for a winmm.dll service, then the software switches back to the active mode. This ensures the best system performance, as the software is active only when there is a request for a winmm.dll service.

In further alternative embodiments that operate under all Windows platforms, while the replacement kernel software 214 is active, it installs a "Module-Load-Monitor" thread 212 that monitors the loading of any module by the application 202. If the application is loading the winmm.dll or requesting a service from the winmm.dll then the software changes the reference to winmm.dll or the winmm.dll service to call another module provided by the interception layer software 204.

The replacement kernel module 214 intercepts all the calls and messages that go from the application 202 to the media SDK (e.g. winmm.dll) and dispatches them to interception layer 204. Therefore, the interception layer software 204 module receives all the requests for waveform input and output services. In some embodiments, the interception layer software 204 includes two controllers: the first controller is the Wave-Out Audio Controller that manages the requests for audio output services and the second controller is the Wave-In Audio Controller that manages the requests for audio input services.

In general, the Wave-Out Audio Controller is capable of doing the following functions:

collect all the audio data that goes from the application to the windows Wave-Out system.

collect the audio data of each Wave-Out session in a different buffer filter some audio output buffers before being dispatched to the output sound device.

process the output of the audio data, which includes applying an external audio processor before sending the audio output data to the sound card. For example, the interception layer can provide "mixer" functions or "3D" effects.

Monitoring listeners' behavior (Wave-Out): the software can detect the start date and time of each Wave-Out session as well as the date and time duration the session has ended. Therefore, it can define exactly how long any song was played by the system.

Audio filtering: The software can filter the whole Wave-Out/Wave-In session and can filter specific parts of the audio input/output. It can filter the content based on the time duration or as a results of applying any external audio processor.

Audio recording: The software records the audio input and output waveform data to external files. It saves the data in Windows WAV file format. The software is capable also of encoding the output waveform data into different types of popular commercial audio file formats. It is well integrated with different sets of CODEC SDKs and can encode the output files to Real Audio format, Windows Audio format and MP3 format. It is prepared to support any file format encoder.

Deferred audio delivery: For waveform output, the software is capable of collecting the audio data from the application without sending it to the output device. This is done transparently from the application. Therefore, the application continues sending more data and does not stop as it has a fake sense that the output sound device plays the output audio data. For Waveform input, the software is capable of collecting the audio input data from the input device without sending them to the application the moment they are they are received. After then, it can send them to the application as even they have been just received from the input device. This requirement is very important for many audio processors that require processing the audio content as a whole before the application for audio input and before the sound card for audio output.

In general, the Wave-In Audio Controller is capable of performing the same types of functions provided by the Wave-Out Audio Controller except that it applies it to input audio data.

This section has described the various software components in a system that provide for the interception of media data, including waveform audio data. As those of skill in the art will appreciate, the software can be written in any of a number of programming languages known in the art, including but not limited to C/C++, Java, Visual Basic, Smalltalk, Pascal, Ada and similar programming languages. The invention is not limited to any particular programming language for implementation.

CONCLUSION

Systems and methods that provide for the interception of media data streams are disclosed.

The embodiments provide numerous advantages over previous systems, and various embodiments include various combinations of the following features:

Unified audio format: the software collects all the audio input and output data in the standard waveform format regardless of the input audio file format used by the application to store the audio data.

Session based: The software establishes a separate audio collection session for each waveform audio input and output session performed by the application.

Application neutral: The software implementation is transparent to the implementations details of the application. It can collect the waveform output data from any Windows applications as long as it uses the Microsoft waveform SDK.

Application awareness: the software provides separate audio collection sessions for each application. This enables the software to define the application interacts with the waveform SDK for both audio input and output. It enables the software to provide different set of customized audio management features per application.

Sound driver neutral: the software is independent of the sound driver implementation therefore it works with any sound driver installed in the user windows system.

User transparent: All the software operations are hidden to the user who can not disable the software operations except by uninstalling the software itself through the software uninstall program.

Persistent installation: The software provides several techniques to force itself to be always active regardless of any tool that is installed on the system and tries to uninstall or deactivate the software.

Consistent functionality over any Windows 32 platform whether it is Windows NT or Windows 95 based platform.

Upward compatibility for windows operating systems.

Hidden from the user and the user has no control over it.

Safety and Robustness: The software component that does not conflict with other system monitoring tools. Additionally, the interception software does not affect any other application running in the system outside the address space of the audio player.

In addition to the aspects described above, Appendix A provides a description of an embodiment that includes components described above to provide a digital rights management system.

Furthermore, Appendix B provides details of an alternative digital rights management system according to an embodiment.

The discussion provided in Appendix A and Appendix B refers to watermarking. While any general file watermarking can be adapted to the embodiments described above, specific methods of watermarking are described in the following patents and patent applications, all of which are hereby incorporated by reference herein for all purposes.

| Ser. No. | Filed | Title | Status |
| --- | --- | --- | --- |
| 08/918,122 | Aug. 27, 1997 | Method and Apparatus for Embedding Data, Including Watermarks, in Human Perceptible Images | Issued: Feb. 29, 2000 U.S. Pat. No. 6,031,914 |
| 08/918,891 | Aug. 27, 1997 | Method and Apparatus for Embedding Data, Including Watermarks, in Human Perceptible Sounds | Issued: May 9, 2000 U.S. Pat. No. 6,061,793 |
| 08/918,125 | Aug. 27, 1997 | Method and Apparatus for Video Watermarking | Issued: Aug. 28, 2001 U.S. Pat. No. 6,282,299 |
| 08/921,931 | Aug. 27, 1997 | Method and Apparatus for Scene-Based Video Watermarking | Issued: May 1, 2001 U.S. Pat. No. 6,226,387 |
| 08/918,126 | Aug. 27, 1997 | Digital Watermarking to Resolve Multiple Claims of Ownership | Issued: Aug. 7, 2001 U.S. Pat. No. 6,272,634 |
| 09/228,224 | Jan. 11, 1999 | Multimedia Data Embedding | Issued: Aug. 27, 2002 U.S. Pat. No. 6,442,283 |
| 09/481,758 | Jan. 11, 2000 | Transaction Watermarking | Issued: Jul. 5, 2005 U.S. Pat. No. 6,951,481 |
| 09/480,391 | Jan. 11, 2000 | Degradation Watermarking | Abandoned |
| 09/585,102 | May 31, 2000 | Persistent Linking Via Watermarking | Abandoned |
| 09/573,119 | May 16, 2000 | Systems And Methods For Providing Authorized Playback And Tracking Of Multimedia Content Over Networks | Abandoned |

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description and the attached appendices.

APPENDIX A

The Concept

The basic idea is to have two audio files, the first file is a distributable audio file that will be available for public download to the end users community, (we will call this file, the Public Track) while the second audio file will be the complete secured track, (we will call this file the Private Track). The user can listen, play and distribute the Public track without any restriction.

Each Public Track has a Track-Id that is used to identify the track at any time. The corresponding Private Track has also the same Track-ID. In addition to the Track-Id there is one bit that indicates the type of the Track. For the Public Track the bit value is zero and for the private Track the bit value is one.

The Private Track will be encrypted and hosted and secured on a remote server not accessible by the end user. Each Private Track is encrypted with a unique encryption key. The Decryption Key for each Private Track is hosted securely also on a remote server.

The Private Track will be hidden to the user. It will be handled in transparently to the user. The user can never have access to the Private Track file in an open non-encrypted form.

If cognicity software is installed, then at any time there is an access to the Public Track then Cognicity software checks if the corresponding Private Track is installed to the user local hard disk or not. If the Private Track is installed then the software transparently switches the file access operation to point to the Private Track. The Private Track is still encrypted and not available in a decrypted form. If the Private Track is not available on the user machine then the software establishes a secure connection with the server to download both the Private Track and the Decryption Key (required to decrypt this specific Private Track). During file reading operations, the software uses the Decryption Key and decrypt the Private Track data on the fly as being read by the application.

Theoretically, the Public Track can contain any audio data. The Private Track does not have to have a direct match or overlap with the data used for the Private Track. However, for the purpose of Cognicity application the Public Track audio data was prepared by cutting the proper audio data from the Private track.

While editing the Public Track a promotional audible message is added near the end of the track to encourage the end user to download the software to listen to the full track (Private Track).

Implementation Details

A system level file system controller has been developed. This file system controller provides a full control on the application level for all the types of file access operations done by the application. The following types of controls have been provided:

monitor and control the application file open operations.

monitor and control the application file read/write operations.

monitor and control the application creation of any new file monitor and control the access of the memory mapped files monitor and control all the file operations that enables the application to retrieves the file information and in particular the file size.

Cognicity watermarking technology is used to encode the watermark value inside both the Private Track and the Public Track. The watermark value used is equal to the Track-Id designed for each Track. As mentioned earlier, there is on added bit that indicates the type of the track.

An system level audio interceptor has been developed to collect the audio data as being played by the application. The system audio collector collects the audio data as being played by the application in a raw PCM format. It interacts with Cognicity watermark decoder to decode the watermark on the fly while the track is being played by the application. The system level audio interceptor and detector can collect any audio data played by the application whether the application is using the Windows Wav-out SDK or using the Direct Sound SDK to play the audio tracks.

The software supports four basic media file formats: WAV, Real Media, Windows Media and MP3 formats. For each format, a format decoder has been implemented. The basic function of each format CODEC is as follows:

1. decode the audio content of any file. This is required to decode the watermark directly from the file
2. extract the value of any attribute. This is used to extract the values of the attributes the software uses to store the Track-Id
3. modify the value of any attribute and add the attribute if the attribute does not exist.

The Public Track and Private tracks are encoded in three audio file formats Real Media, Windows Media and MP3. While encoding the Private Track a format-specific attribute is added to define the track-id of the Public Track. There is format attribute used for the Private Track as the file is not available to the end user.

The software uses some DRM rules to allow the substitution of the Public Track with the Private Track. The DRM rules are hosted on a remote secure server and retrieved from the server as the Private Track is downloaded from the server. The DRM rules specifies the following:

1. How many times the user can listen to the full track (how many times the software will substitute the Public Track with the Private Track)
2. The Track expiration data and time. The date and time are specified as referenced to the user machine local time or referenced to Greenwich local time.

Internal System Operations

1—Upon file open: the software checks the file format, if the file is an audio file in one of the formats supported by the software (Real Media, Windows Media and MP3) then the software staffs by trying to extract the format attribute value that corresponds to the Track-Id. If the value does not exist in the format attribute then the system starts to decode the first 10 seconds of the audio format and starts to decode the watermark value that corresponds to the track-id if available. If the track-id was extracted successfully (whether from the format attribute or through the watermark decoding) then the software knows that this is a Public Track. The software can verify this fact by checking the bit that defines the type of the track. The software locates the DRM rules for this Public Track if the rules allow the play of the Private Track then the software starts to locate the Private Track. If the Private Track is available then the software opens the Private Track and return the file handle to the application. If the Private Track is not available then the software lets the Public Track to be played with no substitution and starts to download the Private Track and the Decryption Key through a background process.

2—During file reading operations, the software checks if the handle passed In the file read operation is one of the handles created for Private Tracks. If the handle corresponds to a Private Track then the software read the proper data from the Private Track file and decrypts those data then copy the data back to the application buffer. This step requires an accurate file read synchronization as the application block size for reading data is not equal to the block size used to decrypted the Private Track.

3—During any kind of file information enumeration or retrieval done by the application; the software checks each file to define whether it is a Public Track or not. The check used is similar to that described in point 1. If the file corresponds to a Public Track then the software locates the corresponding Private Track and retrieve the required information for the Private Track then copy the result back to the application return buffer. This step ensures that the applications allocates memory buffers sufficient to read the content of the Private Track not the Public Track. It also ensures that the application display the play duration time in the application user interface that corresponds to the length of the Private Track and not the Public Track.

4—Upon audio play operations, the audio system interceptor decodes the watermark if any. If there is a watermark, then the software staffs checks the bit that indicates the type of the track. If the bit indicates a Private Track then the interceptor increases the play count of this track. This play count is used in step 1 as part of the DRM rules.

Protecting the Write Back of the Private Track

There are different techniques that enable the end user to save any audio content back to a file while the file is played by any application on his machine. If there is no secured protection for this techniques then the end user can install the software, get the proper DRM rules as a regular user, listen to the Private Track and then use any audio write-back tool to get the content of the Private Track in an open format.

The software provides solutions on different levels to secure the audio write-back case. The application apply solutions on different levels as follows:

1. Having a list of trusted applications that can receive the decrypted content of the Private Track: The software does not only apply DRM rules per the end user but it also apply a concept of trusted applications. The software has a list of the applications that are trusted for not to distribute the content by any illegal way and read the content to play the content only. As case examples, if an application reads the content and plays the content as usual but sends the content transparently through an email or so then the application will be classified as non-trusted application. Before substituting the Public Track with the Private Track the software verifies the caller application. If the application is not trusted then it will not do the substitution.
2. Some audio player applications provides a standard feature to the end user to encode the audio files to different file formats. Those audio players are trusted and do not do hidden operations. For those trusted applications the software does the substitution if the user is playing the Public Track, however, if the user is encoding the Public Track to another file format then the software detects the case and do not do the substitution.
3. There are some tools available today in the market like "Total Recorder" that enables the user to record the music played by any application back to a file. A legal user can play the Private Track by a trusted application and uses Total recorder to save the content back to a file. The software has a smart sensors that detects this kind of write-back actions and erases the files as they are saved by the user to a local file.

Tracks Prodution Phase

The production phase starts by having the PCM data corresponds to both the Private Tracks and the Public Track. The operator defines the Track-Id used for this pair of tracks. It then encode the watermark into both tracks with the bit that indicates the track type added to the watermark value. After then, both Tracks are encoded to the proper file format (RealAudio, Windows Audio or MP3). The format attribute that's equivalent to the watermark value is added also to encoded tracks. Then, the production software starts to encrypt the Private Track and generate the Decryption Key.

The system operator takes the Private Track, Decryption Key, Public Track as well DRM rules and upload them to the proper location on the designated server.

Generalization of the Concept

The same idea can be applied easily to any media content whether it's for audio content or video content or even mixed content. The same watermark technology can be used as well as the file format attributes.

A "DRM" like solution that is format agnostic. The objective, of course, is to strongly motivate the listeners to download our software, thereby allowing a media provider to get the information you seek in return for the free music.

Described below are two approaches to Digital Rights Management. Both effectively and easily solve the problem of allowing: non-users of media player software to be able to play NO more than 30 seconds of audio NO MATTER HOW they get the audio tracks.

Figure 3:
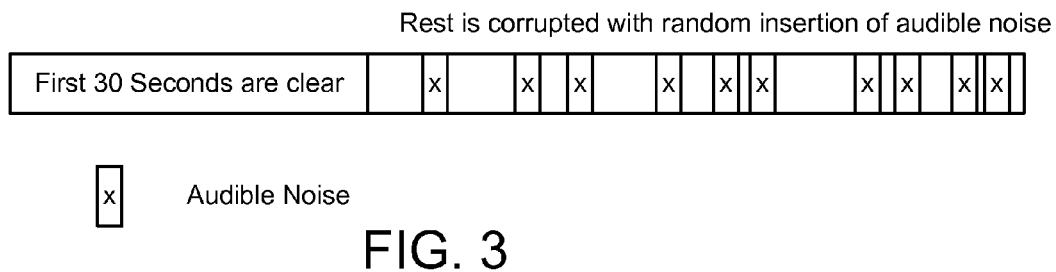
FIG. 3 is a diagram illustrating one approach of a digital rights management system.

Approach 1 is illustrated in FIG. 3

In this approach shown in FIG. 3, the file consists of clean first 30 seconds plus a corrupted remainder. The corruption takes the form of many audible noise clips inserted at random locations within the track.

Without our software player reads whole file, renders first 30 seconds perfectly and renders all noise clips in remainder of the track resulting in an unusable remainder.

With our software

Our software can read the watermarks in the random insertions and block the rendition of these clips. Result: a pristine file.

Comments
a. Non-user hears 30 seconds and plus corrupted sound of variable duration.
b. File forwarded by a listener is as long as original.
c. If I forward a track to someone who has our software, he or she can play the pristine version with no additional download, even if I changed the format of the file.
d. Solution is format agnostic and survives format changes.

Figure 4:
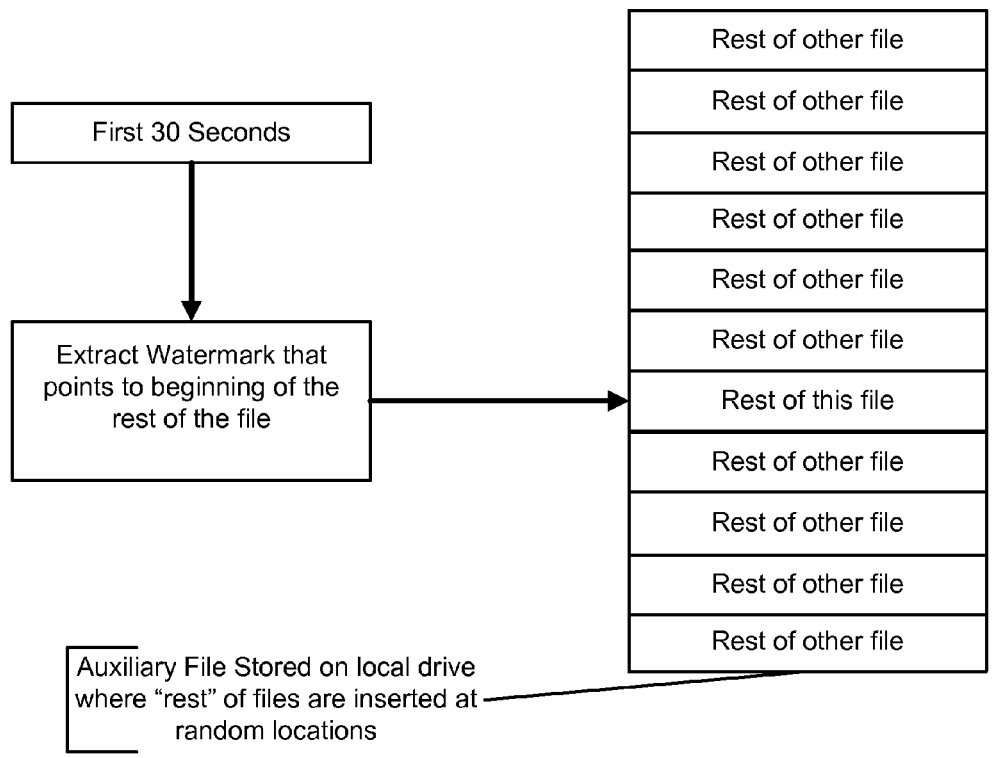
FIG. 4 is a diagram illustrating another approach of a digital fights management system.

Approach 2 is illustrated in FIG. 4

In this approach shown in FIG. 4, a file is broken into 2 or more separate files. The first 30 seconds are in one file that is clearly named and can easily be forwarded to others. The rest of the file is inserted at a random location within a larger "auxiliary file" that resides on the user hard drive.

A watermark extracted from the first 30 seconds points to the location of the rest of the file in the auxiliary file.

For added security, the rest is broken into several pieces, each inserted at a random location and each containing a watermark pointer to the piece that comes after it.

Without our software

Listener can only play first 30 seconds. Listener will not play a corrupted remainder.

With our software

File is seamlessly assembled for player. Listener can hear the full song.

Listener can only forward the first 30 seconds.

(Listener can also forward the auxiliary file. However, that file will be large and cannot be properly played without the watermark extraction as it consists of randomly ordered blocks from many tracks.)

Comments
a. Non-user hears only 30 seconds and no corrupted sound.
b. File forwarded by listener is always the 30 second version.
c. If I forward a track to someone who has our software, he or she will need an additional automatic download to play the pristine version.
d. Solution is format agnostic and survives format changes. A format change requires further processing by our software.

I claim:

1. A method of detecting a digital watermark embedded in a host signal comprising:
   receiving the host signal including a media signal and a digital watermark that has been perceptually adapted to the media signal in frequency and non-frequency domains;
   processing the host signal with a representation of the digital watermark to compute a measure of the digital watermark; and
   based on the measure of the digital watermark, extracting the digital watermark from the host media signal wherein the host signal has autocorrelation properties that enable synchronization of the digital watermark despite temporal or geometric distortion of the host signal.

2. A method of digital watermarking a media signal comprising:
   deriving a first key that is a function of the media signal;
   generating a digital watermark signal that is a function of the first key and a second key that is not dependent on the media signal;
   embedding the digital watermark in the media signal.

3. A method of detecting a digital watermark in a host signal comprising:
   obtaining a first key that is a function of the host signal;
   generating a representation of a digital watermark from the first key and a second key that is not dependent on the host signal; and
   processing the host signal with the representation of the digital watermark to extract the digital watermark from the host signal.

* * * * *